US012631993B2

(12) United States Patent
Takatsuka

(10) Patent No.: US 12,631,993 B2
(45) Date of Patent: May 19, 2026

(54) IMAGE FORMING APPARATUS AND FUSING CONTROL METHOD

(71) Applicant: SHARP KABUSHIKI KAISHA, Sakai City (JP)

(72) Inventor: Kazuki Takatsuka, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/921,514

(22) Filed: Oct. 21, 2024

(65) Prior Publication Data

US 2025/0138457 A1 May 1, 2025

(30) Foreign Application Priority Data

Oct. 30, 2023 (JP) ................................ 2023-185771

(51) Int. Cl.
*G03G 15/20* (2006.01)

(52) U.S. Cl.
CPC ....... *G03G 15/205* (2013.01); *G03G 15/2064* (2013.01); *G03G 2215/2032* (2013.01)

(58) Field of Classification Search
None
See application file for complete search history.

(56) References Cited

U.S. PATENT DOCUMENTS 5,598,639 A * 2/1997 Webb .................... G01L 5/0085 33/657
2016/0370741 A1* 12/2016 Hayashi ............. G03G 15/2064
2018/0088501 A1* 3/2018 Maeda ................. G03G 15/205
2019/0265620 A1* 8/2019 Kadowaki .......... G03G 15/2053
2020/0192256 A1* 6/2020 Koyama ............ G03G 15/2039
2021/0063922 A1* 3/2021 Yamashita ......... G03G 15/5062
2024/0160131 A1* 5/2024 Doda ................. G03G 15/5004

FOREIGN PATENT DOCUMENTS

JP 2009-228480 A 10/2009
JP 2017-026739 A 2/2017

* cited by examiner

*Primary Examiner* — Sevan A Aydin
(74) *Attorney, Agent, or Firm* — ScienBiziP, P.C.

(57) ABSTRACT

An image forming apparatus includes: a heating portion including a heating source; a pressing portion that presses the heating portion while in contact with it; a temperature detector that detects the temperature of the heating portion and/or the pressing portion; and a conveyer that guides a print sheet with a toner image through a nip portion where the heating portion and the pressing portion are in contact with each other; and a controller that controls the heat source and the conveyer. The controller controls the heating source to set the heating portion to target temperature during execution of a print job, determines a nip width magnitude, on the basis of the temperature variation of the heating portion and/or the pressing portion and heat generation of the heating source by rotating them when the print job is not being executed, and changes the target temperature on the basis of the determination.

6 Claims, 10 Drawing Sheets

FIG. 10A

| NIP WIDTH | PREDICTED TEMPERATURE (°C) | | | | TARGET CONTROL TEMPERATURE (°C) |
|---|---|---|---|---|---|
| | PRESSURE ROLLER (START) | PRESSURE ROLLER (END) | FUSING BELT (START) | FUSING BELT (END) | |
| REFERENCE VALUE -1(mm) | REFERENCE VALUE -4 | REFERENCE VALUE +25 | REFERENCE VALUE +4 | REFERENCE VALUE +15 | REFERENCE VALUE ×1.05 |
| REFERENCE VALUE (10mm) | REFERENCE VALUE | REFERENCE VALUE +32 | REFERENCE VALUE | REFERENCE VALUE | REFERENCE VALUE |
| REFERENCE VALUE +1(mm) | REFERENCE VALUE +4 | REFERENCE VALUE +34 | REFERENCE VALUE -6 | REFERENCE VALUE -11 | REFERENCE VALUE ×0.95 |

↑T=11sec ↑T=31sec ↑T=11sec ↑T=31sec

FIG. 10B

| NIP WIDTH | PREDICTED TEMPERATURE (°C) | | | | TARGET CONTROL TEMPERATURE (°C) |
|---|---|---|---|---|---|
| | PRESSURE ROLLER (START) | PRESSURE ROLLER (END) | FUSING BELT (START) | FUSING BELT (END) | |
| REFERENCE VALUE -1(mm) | 101 | 130 | 149 | 160 | 152 |
| REFERENCE VALUE (10mm) | 105 | 137 | 145 | 145 | 145 |
| REFERENCE VALUE +1(mm) | 109 | 139 | 139 | 134 | 138 |
| | ↑T=11sec | ↑T=31sec | ↑T=11sec | ↑T=31sec | |

IMAGE FORMING APPARATUS AND FUSING CONTROL METHOD

CROSS-REFERENCE TO RELATED APPLICATION

The present application claims priority from Japanese Application JP2023-185771, the content to which is hereby incorporated by reference into this application.

BACKGROUND OF THE INVENTION

1. Field of the Invention

The disclosure relates to an image forming apparatus including a rotatable heating portion and a rotatable pressing portion in contact with the heating portion, and a fusing control method.

2. Description of the Related Art

There is known an image forming apparatus including a fusing device including a heating portion and a pressing portion (pressing portion) that is brought into pressure contact with the heating portion (heating portion) in order to fuse toner to a print sheet to which the toner has been transferred. For example, there is an image forming apparatus including a fusing device including a heating portion formed of a fusing belt stretched between a heating roller having a heat source such as a heater therein and a fusing roller, a pressing roller pressed against the fusing roller, and a sensor such as a thermistor for detecting the surface temperature of the heating roller.

In such a fusing device, heat is transmitted to a nip portion by the rotation of the heating roller, and the temperature of the nip portion does not rise when the heating roller is stopped. In view of this, in order to accurately detect the temperature of the nip portion, when a non-operating state such as a sleep state shifts to an operating state in which the heating roller rotates in response to a print instruction or the like, measurement of the rotation time is started, and the temperature of the nip portion is estimated. That is, during the warm-up before the start of printing, the temperature of the nip portion is estimated on the basis of the rotation time from the start of the rotation of the heating portion and the stop time during which the heating portion is stopped before the rotation. At the point in time when the measurement of the rotation time is started, in other words, at the point in time when the warm-up before printing is started, there is a possibility that the nip portion is warmed to some extent by the rotation of the heating portion immediately before. Therefore, the initial value of the rotation time at the start of the measurement of the rotation time is increased in accordance with the rotation time of the heating portion before the stop time of the heating portion immediately before the start of the measurement. If the estimated temperature of the nip portion obtained in this manner is higher than the target temperature, the power supplied to the heating portion is reduced in accordance with the difference. In contrast, if the estimated temperature of the nip portion is lower than the target temperature, the power supplied to the heating portion is increased in accordance with the difference.

There is also known an image forming apparatus including a fusing device including a heating roller provided with a heater, a pressing roller that rotates in contact with the heating roller, a thermistor that detects the temperature of the heating roller, and a switching mechanism that switches the nip width between plain paper and an envelope. Such an image forming apparatus receives a print instruction from a user in order to detect the nip width by using existing components. When the temperature becomes equal to or higher than a predetermined rotation start temperature, idle rotation in which the heating roller rotates in direct contact with the pressing roller is started. Then, a temperature gradient of the temperature detected by a thermistor TH after the start of the idle rotation is calculated. On the basis of the calculated temperature gradient, it is determined whether the current nip width is in a normal state or an abnormal state corresponding to the paper type (plain paper/envelope) indicated by the print instruction, and if it is determined to be abnormal, the user is notified of the abnormality.

SUMMARY OF THE INVENTION

The nip width, i.e., the width of the nip portion in the sheet conveyance direction, is one of the factors that significantly affect fixability. The quotient the nip width by the speed of the print sheet passing through the nip portion corresponds to a time required for the print sheet to pass through the nip portion, that is, a heating time during which heat is supplied from the heating portion. The nip width magnitude varies from image forming apparatus to image forming apparatus due to variability in the hardness of the pressing roller and variability in the mechanism of the pressure unit (such as variations in the distance between the axes of the heating roller and the pressing roller and variability in the pressure of the pressure spring). Even in the same image forming apparatus, the nip width magnitude may change due to a decrease in the hardness of the pressing roller over time.

If the nip portion varies in size due to variability or a change over time, the fusing performance may be adversely affected. If the nip portion is too small, a fusing failure may occur. In contrast, if the nip portion is too large, the fusing quality may deteriorate due to excessive heating. Moreover, if the nip portion is too large, the amount of heat moving from the heating portion to the pressing portion increases, and the amount of heat escaping from the heating portion to other members increases more than expected, which is not preferable from the viewpoint of energy saving.

An object of the disclosure, which has been made in view of the circumstances as described above, is to estimate a nip portion with a simple configuration and to more appropriately control the fusing temperature on the basis of the estimation, thereby ensuring fusing quality.

An aspect of the disclosure provides an image forming apparatus including: a rotatable heating portion including a heating source; a rotatable pressing portion that presses the heating portion while being in contact with the heating portion; a temperature detector that detects the temperature of the heating portion or a temperature of each of the heating portion and the pressing portion; a conveyer that rotates and stops the heating portion and the pressing portion, and guides a print sheet on which a toner is transferred through a nip portion where the heating portion and the pressing portion are in contact with each other; and a controller that controls the heating source and the conveyer, wherein the controller controls the heating source such that the temperature of the heating portion becomes a target temperature during execution of a print job during which the print sheet passes the nip portion, determines, on a basis of a relationship between temperature variation of at least one of the heating portion and the pressing portion and heat generation of the heating source, a nip width magnitude by rotating the heating portion and the pressing portion when the print job is not being executed, and changes the target temperature on the basis of the determination.

Another aspect of the disclosure provides a method of controlling fusing including: controlling a heating source such that a temperature of a heating portion reaches a target temperature during execution of a print job, by a controller that control an image forming apparatus including the heating portion including a heating source, the heating portion being rotatable; a rotatable pressing portion that presses the heating portion while being in contact with the heating portion; a temperature detector that detects the temperature of the heating portion or a temperature of each of the heating portion and the pressing portion; and a conveyer that rotates and stops the heating portion and the pressing portion, and guides a print sheet on which a toner is transferred through a nip portion where the heating portion and the pressing portion are in contact with each other; determining, on a basis of a relationship between temperature variation of at least one of the heating portion and the pressing portion and heat generation of the heating source, a nip width magnitude by rotating the heating portion and the pressing portion by the conveyer when the print job is not being executed; and changing the target temperature on the basis of the determination.

In the image forming apparatus according to an aspect of the disclosure, since the controller determines the nip width magnitude on the basis of the relationship between the temperature variation of the heating portion and/or the pressing portion and the heat generation of the heating source by rotating the heating portion and the pressing portion when a print job is not being executed and changes the target temperature on the determination, the nip portion can be estimated with a simple configuration, and the fusing temperature can be appropriately controlled on the basis of the estimation, to maintain the fusing quality.

The fusing control method according to the disclosure also exerts the same operational effect.

BRIEF DESCRIPTION OF THE DRAWINGS

FIG. 10A is a data table of a calculation example of nip width estimation and target control temperature correction based on the temperature variation of the pressing roller in an embodiment of the disclosure.

FIG. 10B is a data table of a numerical example of nip width estimation and target control temperature correction based on the temperature variation of the pressing roller in an embodiment of the disclosure.

DETAILED DESCRIPTION OF THE INVENTION

Modes of the disclosure will now be described with reference to the accompanying drawings. The following description is illustrative in all respects and should not be construed as limiting the disclosure.

Configuration Example of Image Forming Apparatus

Figure 1:
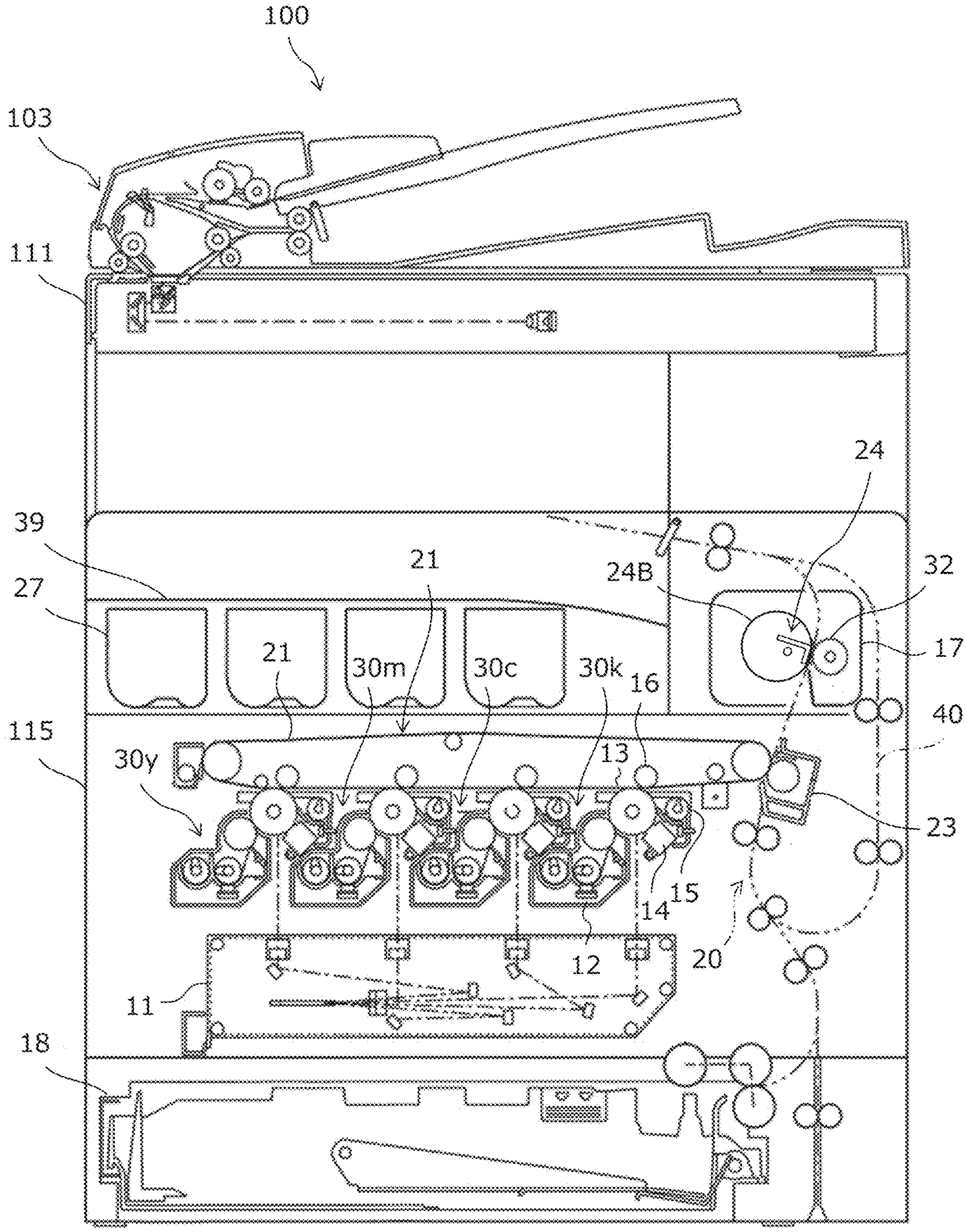
FIG. 1 illustrates the inner configuration of a multifunction peripheral of an embodiment of the image forming apparatus according to the disclosure.
Figure 2:
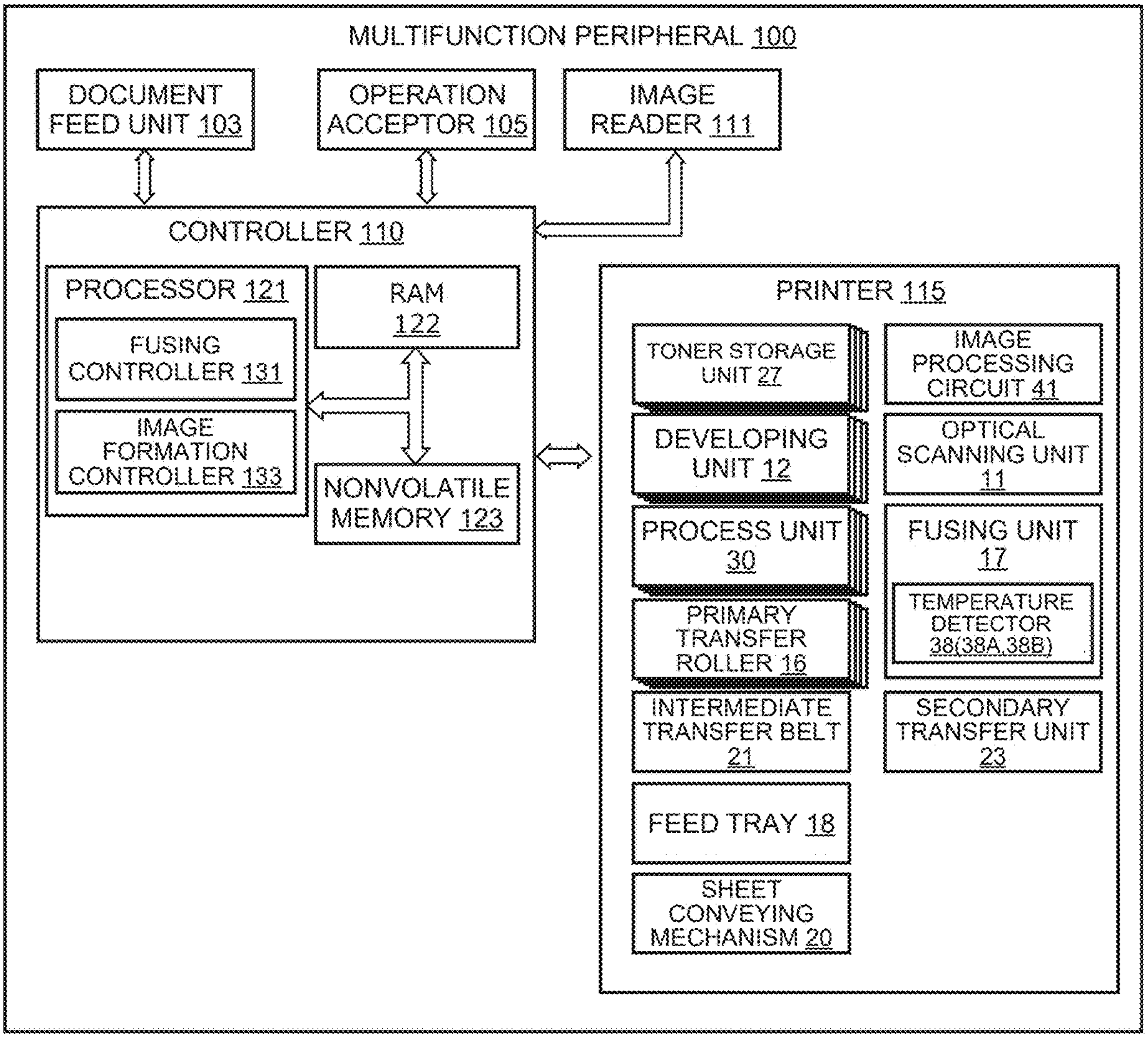
FIG. 2 is a block diagram illustrating a configuration of the multifunction peripheral illustrated in FIG. 1.

FIG. 1 illustrates the inner configuration of a digital multifunction peripheral of an embodiment of the image forming apparatus according to the disclosure. FIG. 2 is a block diagram illustrating the configuration of a multifunction peripheral 100.

As illustrated in FIG. 1, the multifunction peripheral 100 includes, in its main body, an image reader 111 that reads documents and a printer 115 that forms images. The multifunction peripheral 100 further includes a feed tray 18 below the printer 115. The multifunction peripheral 100 further includes an output tray 39 above the printer 115 and below the image reader 111. The multifunction peripheral further includes a document feed unit 103 that conveys a document to the image reader 111 above the image reader 111. The multifunction peripheral 100 further includes an operation acceptor 105 (not illustrated in FIG. 1, see FIG. 2) that receives user operation on the front side of the image reader 111.

Here, the internal configuration of the multifunction peripheral 100 for image formation will be described.

The multifunction peripheral 100 forms four-color toner images of yellow (Y), magenta (M), cyan (C), and black (BK) using an electrophotographic process, overlays the toner images on an intermediate transfer belt 21, and prints a color image on a print sheet. Alternatively, the multifunction peripheral 100 forms a monochrome image using a single color (e.g., black) on a print sheet. For this purpose, the printer 115 includes four process units 30 (indicated by the reference signs 30*y*, 30*m*, 30*c*, and 30*k* in FIG. 1) each including therein a developing unit 12, a photosensitive drum 13, a charger 14, a drum cleaner 15, and the like. An optical scanning unit 11 is provided to expose and scan the photosensitive drum 13 corresponding to each color with a laser beam. The multifunction peripheral 100 includes a sheet conveying mechanism 20 as a conveyer. The sheet conveying mechanism 20 includes rollers arranged along the conveying path, a motor, a clutch, and the like for driving the rollers. The sheet conveying mechanism 20 as a conveyer feeds a print sheet from the feed tray 18 and guides the print sheet to the output tray 39 or a duplex conveying path 40 via a secondary transfer unit 23 and fusing unit 17.

The multifunction peripheral 100 includes the process units 30*y*, 30*m*, 30*c*, and 30*k* for the respective colors, but in FIG. 1, only the components of the yellow process unit 30*y* are denoted by reference numerals, and the components for the other colors are omitted. The process units may also be referred to as the process unit 30 using a representative reference numeral. It should be understood that the description using the representative reference numerals is applied to the Y, M, C, and K colors. Toner storage units 27 corresponding to the respective colors are disposed above the printer 115.

The multifunction peripheral 100 further includes an image processing circuit 41 that generates input signals to the optical scanning unit 11 (see FIG. 2). The image processing circuit 41 processes the image data on the document read by the image reader 111 to generate exposure data regarding an exposure pattern for the photosensitive drum 13. The exposure data corresponds to the pattern of the electrostatic latent image to be formed on the surface of the photosensitive drum 13.

Under the control of an image formation controller 133 illustrated in FIG. 2, the toner image of one of the colors Y, M, C, and K is formed on the photosensitive drum 13 through the electrophotographic process including cleaning by a drum cleaner 15, charging by the charger 14, exposure by the optical scanning unit 11, and development by the developing unit 12.

A primary transfer roller 16 is provided at a position in contact with the photosensitive drum 13 of the process unit 30 through the intermediate transfer belt 21. The image formation controller 133 applies voltage to the primary transfer roller 16 to transfer the Y, M, C, and K toner images formed on the photosensitive drums 13 onto the intermediate transfer belt 21 in a superimposed manner and delivers the toner images to the position in contact with the secondary transfer unit 23. The image formation controller 133 drives the secondary transfer unit 23 and also applies voltage to transfer the toner images to a print sheet fed from the feed tray 18.

Furthermore, the image formation controller 133 controls the sheet conveying mechanism 20 to feed and convey the print sheet from the feed tray 18. The image formation controller 133 causes the secondary transfer unit 23 to feed the print sheet onto which the toner image has been transferred to the fusing unit 17. The fusing unit 17 includes a heating portion 24 in which a heater 36 as a heating source is disposed, a fusing belt 31, and a pressing roller 32. The fusing unit 17 further includes a temperature detector 38 that detects the temperature of at least one of the heating portion 24 and the pressing roller 32. The image formation controller 133 controls the sheet conveying mechanism 20 to guide the print sheet to the nip portion formed between the fusing belt 31 and the pressing roller 32 and cause the print sheet to pass through the nip portion. The fusing unit 17 applies pressure and heat to the print sheet passing through the nip portion to fuse the toner image transferred to the print sheet to the print sheet. A fusing controller 131 illustrated in FIG. 2 controls power supply to the heater of the heating portion 24. Note that the configuration of the fusing unit 17 illustrated in FIG. 1 is a mere example, and the disclosure is not limited such example. For example, the fusing unit may be of a type in which the heating portion does not include the fusing belt and the fusing roller, but includes only a heating roller having a heater disposed therein, and the pressing roller 32 comes into contact with the heating roller to form the nip portion.

The image formation controller 133 control the sheet conveying mechanism 20 to causes the print sheet having passed through the fusing unit 17 to be output to the output tray 39. Alternatively, the print sheet that is switched back is led to a duplex conveying path 40 and returned to the secondary transfer unit 23. The toner image is then transferred to the back side of the print sheet, and the print sheet is output through the fusing unit 17 to the output tray 39.

As illustrated in FIG. 2, a controller 110 includes devices such as a processor 121, a RAM 122, and a nonvolatile memory 123 as hardware resources. The processor 121 executes a control program preliminarily stored in the nonvolatile memory 123 and works with the hardware resources to implement functions as the controller 110. The controller 110 includes the fusing controller 131 and the image formation controller 133. The image formation controller 133 processes data regarding a print job when the multifunction peripheral 100 executes the print job, and controls the operation of each component of the printer 115. The fusing controller 131 controls the fusing unit 17.

Configuration of Fusing Unit

Figure 3:
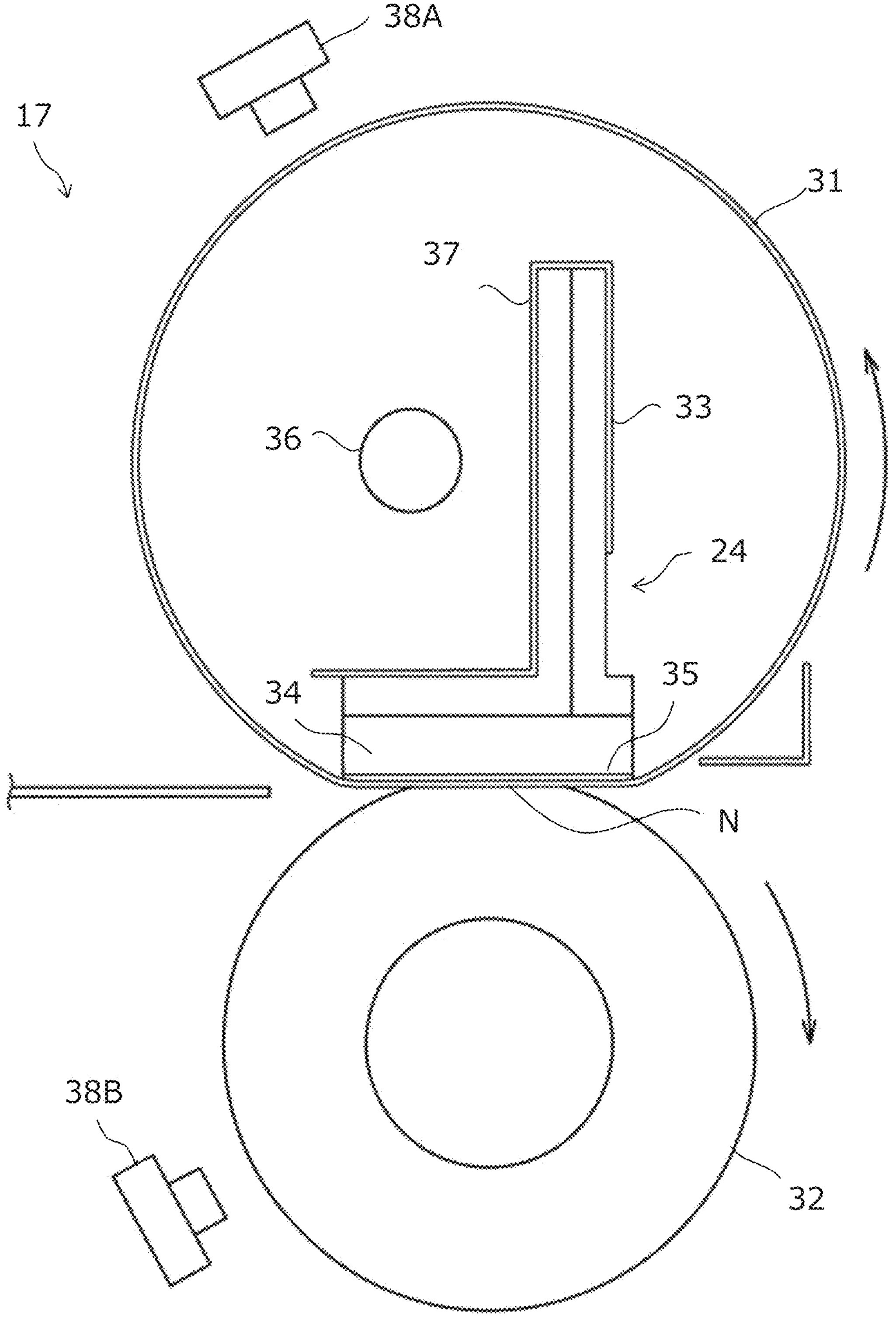
FIG. 3 is a cross-sectional view of the schematic configuration of the fusing unit 17 according to an embodiment of the disclosure.

The fusing unit 17 of the present embodiment will now be described in detail. FIG. 3 is a cross-sectional view of the schematic configuration of the fusing unit 17 according to the present embodiment. As described above, the fusing unit 17 includes the fusing belt 31 and the pressing roller 32 which are rotary fusing members. The fusing unit 17 further includes a support member 33, a fusing pad 34, a sliding sheet 35, a heater 36, and a reflection plate 37 as the heating portion 24 inside the fusing belt 31. The fusing unit 17 further includes a first fusing-temperature sensor 38A and a second fusing-temperature sensor 38B as temperature detectors 38.

The fusing belt 31 is a flexible endless belt and has a substantially annular shape. The fusing belt 31 has a configuration in which a release layer is provided on the surface of a belt-like base material composed of, for example, a synthetic resin, such as polyimide, or a metal, such as nickel. The fusing belt 31 is provided so as to be rotatable about an axis extending along a direction perpendicular to the surface of the page in FIG. 2. The inner diameter of the fusing belt 31 is, for example, 30 mm.

The fusing pad 34 is formed in a long plate-shape extending along the axial direction of the fusing belt 31, and is composed of, for example, a synthetic resin. The sliding sheet 35 is provided on an outer circumferential surface (a surface adjacent to the fusing belt 31) of the fusing pad 34. Note that the length of the fusing pad 34 is substantially the same length as that of the fusing belt 31 in the axial direction.

The sliding sheet 35 is provided to slidingly contact the inner circumferential surface of the fusing belt 31. Although the fusing belt 31 rotates, the fusing pad 34 and the sliding sheet 35 are fixed to the fusing belt 31. A lubricant for reducing a frictional force with the fusing belt 31 may be applied to a sliding contact surface of the sliding sheet 35 that is in sliding contact with the inner circumferential surface of the fusing belt 31.

The support member 33 is a member that supports the fusing pad 34 and the sliding sheet 35 while pressing them against the inner circumferential surface of the fusing belt 31. The support member 33 has, for example, a substantially L-shaped cross-section and has a long plate-shaped fixing portion to which the fusing pad 34 is fixed, and a long plate-shaped erected portion that is erected from the fixing portion.

The heater 36 is a member for heating the fusing belt 31, and extends in the width direction of the fusing belt 31 (in the direction perpendicular to the surface of the page in FIG. 2). The heater 36 is, for example, a lamp heater such as a halogen lamp. However, the disclosure is not limited thereto, and for example, the principle of induction heating may be applied. The fusing belt 31 is heated to, for example, 200° C. to 250° C. by the heater 36.

The reflection plate 37 has a thin plate shape and is disposed so as to cover a surface of the support member 33 facing the heater 36. The fusing belt 31 is efficiently heated by the reflection plate 37.

The pressing roller 32 is provided at a position opposed to the fusing pad 34 with the fusing belt 31 interposed therebetween. The pressing roller 32 rotates about an axis parallel to the width direction of the fusing belt 31 and extends substantially in parallel with the width direction of the fusing belt 31. The fusing belt 31 is pressed against the pressing roller 32 by the fusing pad 34 at a nip portion N between the pressing roller 32 and the fusing belt 31. The pressing roller 32 can have a configuration in which, for example, a surface of a cylindrical core material composed of metal such as aluminum is covered with an elastic member such as rubber.

A driving force from a driving source (not illustrated), such as a motor, is transmitted to the pressing roller 32 via a gear or the like. The pressing roller 32 is rotationally driven by receiving this driving force, and the fusing belt 31 is driven to rotate in a direction opposite to the rotational direction of the pressing roller 32 in conjunction with the rotational driving of the pressing roller 32. The print sheet passes through the nip portion N between the pressing roller 32 and the fusing belt 31 along a sheet conveying direction (a direction moving from the left side to the right side in FIG. 3).

The temperature detector 38 detects a fusing temperature, which is a surface temperature of the fusing belt 31. A peeling plate is disposed downstream of the nip portion N in the sheet conveying direction. Although FIG. 3 illustrates the fusing unit 17 including the fusing belt 31, the scope of the disclosure is not limited thereto. For example, a roller-type fusing unit in which a hollow heating roller is used as a rotary fusing member and a fusing heater as the heating portion is disposed inside the hollow heating roller is also included in the scope of the disclosure.

Fusing Control During Execution of Print Job

Figure 4:
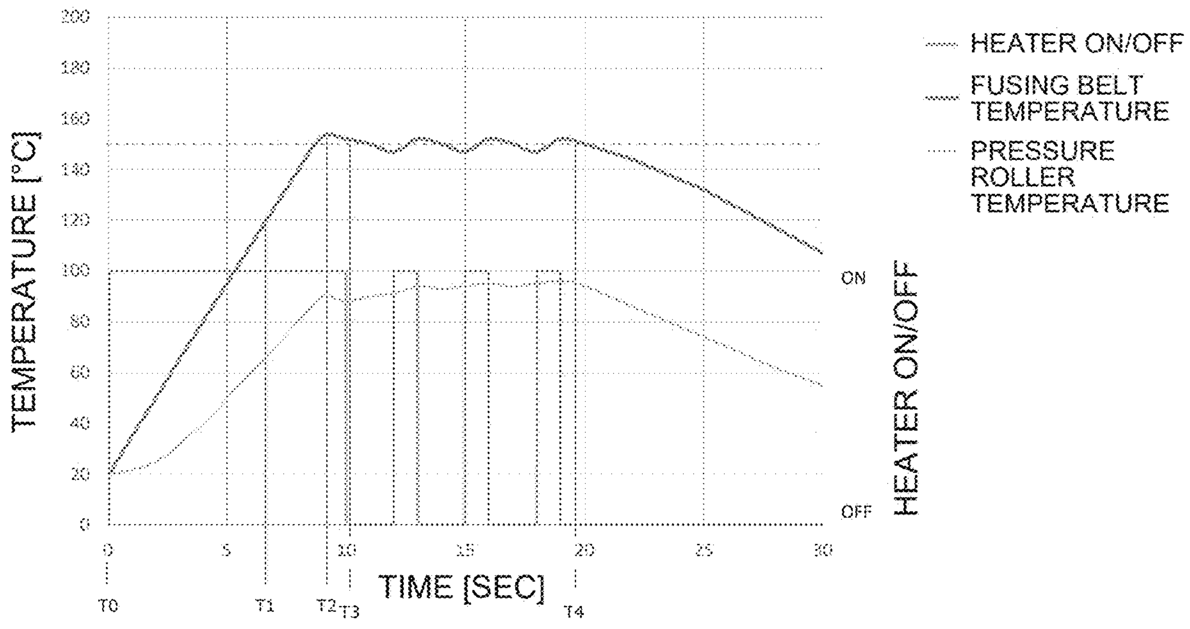
FIG. 4 is a graph illustrating an example of temperature variation of a fusing belt and a pressing roller and the turning on and off of a heater when one print sheet is printed in an embodiment of the disclosure.

The control regarding the fusing unit 17 executed by the controller 110 will now be explained. The control regarding the fusing unit 17 executed while a print job is performed will first be explained. FIG. 4 is a graph illustrating an example of temperature variation of the fusing belt 31 and the pressing roller 32 and the turning on and off of the heater 36 when one print sheet is printed in this embodiment. The fusing unit 17 according to the graph of FIG. 4 includes the first fusing-temperature sensor 38A that detects the temperature of the fusing belt 31 and the second fusing-temperature sensor 38B that detects the temperature of the pressing roller 32. The graph of FIG. 4 illustrates variation in the temperature of the fusing belt 31 detected by the first fusing-temperature sensor 38A and variation in the temperature of the pressing roller 32 detected by the second fusing-temperature sensor 38B.

At time T0 in FIG. 4, the controller 110 receives a print job instruction and starts preparation for printing. At time T0, the pressing roller 32 and the fusing belt 31 of the fusing unit 17 are stopped, the heater 36 is not energized, and the fusing belt 31 is cooled to 20° C., which is the same as the ambient temperature (room temperature). When a print job instruction is received, the fusing controller 131 of the controller 110 turns on the heater 36 to generate heat. The image formation controller 133 controls the sheet conveying mechanism 20 to rotate the pressing roller 32. As a result, the fusing belt 31 also rotates. As the temperature of the fusing belt 31 rises, the temperature of the nip portion also rises, and heat is transferred to the pressing roller 32 via the nip portion, so that the temperature of the pressing roller 32 also rises.

When the temperature of the fusing belt 31 reaches a first temperature, the image formation controller 133 feeds the print sheet designated by the print job from the feed tray 18. The first temperature is a temperature selected so that the temperature of the fusing belt 31 reaches a target control temperature at the time when the leading edge of the fed print sheet reaches the nip portion of the fusing unit 17. In the example illustrated in FIG. 4, time T1 is the time at which the fusing belt 31 reaches the first temperature, and time T2 is the time at which the leading edge of the print sheet reaches the nip portion. Time T3 is the time at which the trailing edge of the print sheet passes through the nip portion.

Immediately before time T2, the temperature of the fusing belt 31 exceeds the target control temperature of 150° C., and the fusing controller 131 turns off the heater 36. During a period from time T2 to time T3, the print sheet passes through the nip portion and fusing is performed. Since the heat is absorbed by the print sheet passing through the nip portion, the temperatures of the fusing belt 31 and the pressing roller 32 drop during that period. The fusing controller 131 controls the on and off states of the heater 36 so that the temperature of the fusing belt 31 is maintained at the target control temperature. After the print sheet passes through the nip and is output to the output tray 39 and the post-processing of the image forming process is completed, the image formation controller 133 controls the sheet conveying mechanism 20 at time T4 to stop the rotation of the fusing unit 17. At the same time, the fusing controller 131 stops the control of the heater 36 for maintaining the fusing belt 31 at the target control temperature. After time T4, the heater 36 is turned off, and the temperatures of both the fusing belt 31 and the pressing roller 32 drop.

Figure 5:
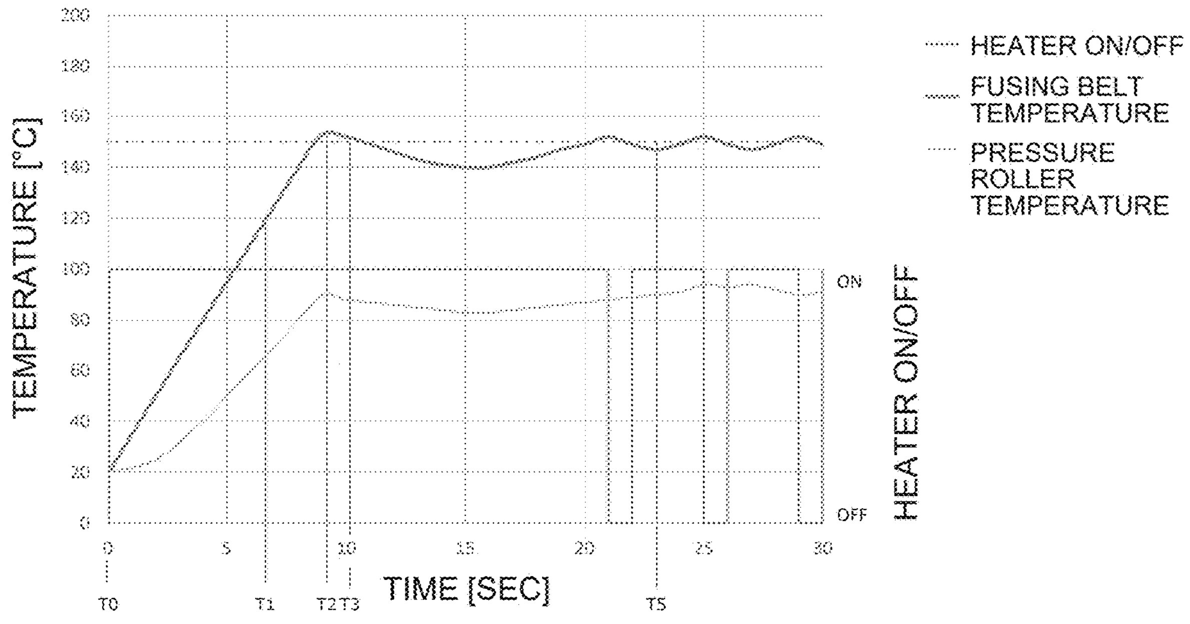
FIG. 5 is a graph illustrating an example of temperature variation of the fusing belt and the pressing roller and the on and off states of the heater when multiple print sheets are continuously printed, unlike FIG. 4.

FIG. 5 is a graph illustrating an example of temperature variation of the fusing belt 31 and the pressing roller 32 and the on and off states of the heater 36 when multiple print sheets are continuously printed, unlike FIG. 4. The variation from time T0 to time T3 is the same as in FIG. 3. Even after the trailing edge of the first print sheet passes through the nip portion at time T3, the subsequent print sheets pass through the nip portion one after another. At time T5, the trailing edge of the final print sheet passes through the nip portion. Heat is absorbed by the print sheets passing through the nip portion, and the temperatures of the fusing belt 31 and the pressing roller 32 temporarily drop and then rise during the period from time T3 to time T5. During this time, the fusing controller 131 turns on the heater 36. When the fusing belt 31 reaches the target control temperature, the fusing controller 131 turns off the heater 36. Thereafter, the heater 36 is controlled to be turned on and off so that the temperature of the fusing belt 31 is maintained at the target control temperature. The variation after time T5 when the trailing edge of the final print sheet passes through the nip portion is the same as the variation after time T3 in FIG. 4.

Fusing Control when Nip Width Magnitude is Determined

Embodiment 1

Figure 6:
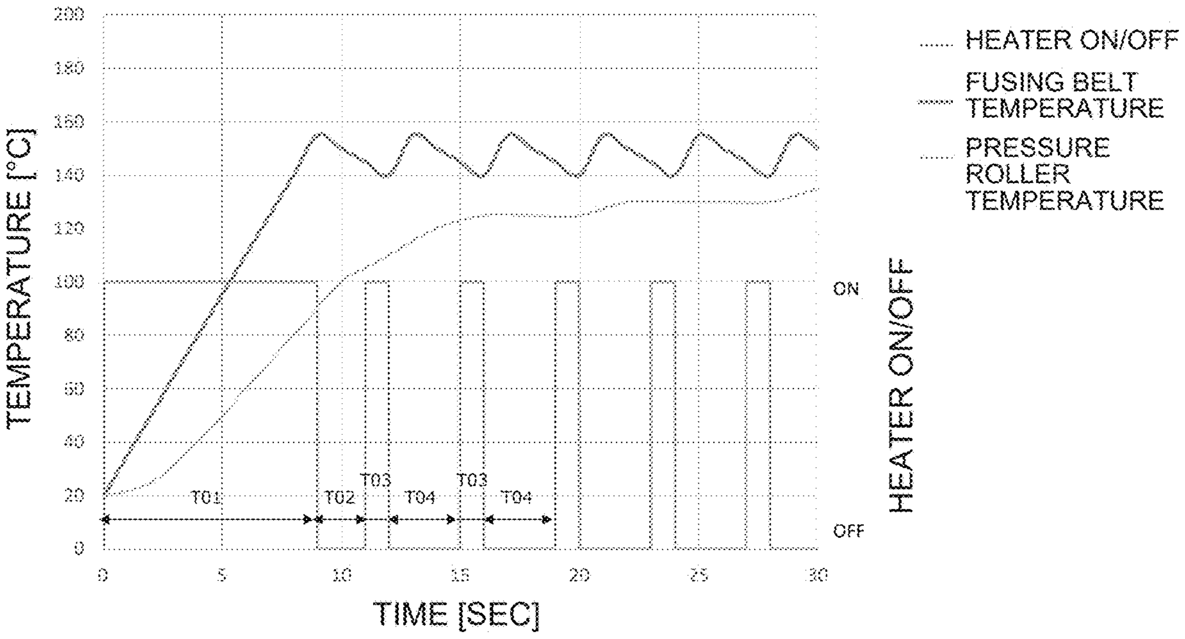
FIG. 6 illustrates an example of on and off states of the heater and temperature variation of the fusing belt and the pressing roller according to the ON/OFF state of the heater when a controller determines a nip width magnitude in the embodiment of the disclosure.

Processing when the controller 110 determines the nip width magnitude will now be explained. FIG. 6 illustrates an example of on and off states of the heater 36 and temperature variation of the fusing belt 31 and the pressing roller 32 according to the ON/OFF state of the heater 36 when the controller 110 determines the nip width magnitude in the embodiment of the disclosure. In FIG. 6, the image formation controller 133 controls the sheet conveying mechanism 20 to rotate the pressing roller 32, and the fusing controller 131 turns on and off the heater 36 in a predetermined pattern. That is, as illustrated in FIGS. 4 and 5, the heater 36 is turned on and off in accordance with a predetermined pattern, instead of being turned on and off to maintain the fusing belt 31 at the target control temperature.

The predetermined pattern is preferably determined with reference to the on/off waveform of the heater 36 illustrated in FIG. 4 when the fusing unit 17 has the size of the reference nip portion as designed. In the case where the heater 36 has reference heat generation characteristics and the fusing belt 31, the support member 33, the fusing pad 34, the sliding sheet 35 and the pressing roller 32 have reference heat transfer characteristics, a pattern determined as such is used. Here, the size of the nip portion is a significant factor of variability as compared with the heat generation characteristics of the heater 36 and the heat transfer characteristics of the fusing belt 31, the support member 33, the fusing pad 34, the sliding sheet 35, and the pressing roller 32.

The controller 110 may determine whether the nip width magnitude is large or small during a period from when the power-off state or the power saving state is canceled to when a print job can be executed. It is also possible to determine the nip width magnitude each time the power-off state or the power-saving state is canceled. However, since the determination on the nip width magnitude involves the measurement of the temperature variation, it takes time to execute the determination. Therefore, for example, it is preferable to execute the process only when a predetermined condition is satisfied, for example, when the multifunction peripheral 100 is newly installed or every time a predetermined period (for example, six months) elapses after the installment. According to this mode, when warm-up is started from the power-off state or the power-saving state in which the heating source does not generate heat, the fusing controller can autonomously determine the nip width magnitude every time or a predetermined number of times. Then, the target temperature can be changed on the basis of the determination. Therefore, a change corresponding to a change in the nip portion due to use is achieved.

Furthermore, when a print job to be executed is received at a point of time when the power-off state or the power-saving state is released or while determining the nip width magnitude, it is preferable to preferentially execute the print job. That is, when a print job is received before or during the determination of the nip width magnitude, the determination of the nip width magnitude is cancelled. Then, it is preferable to postpone the process until an opportunity to cancel the power-off state or the power saving state comes. According to this mode, when a print job to be executed is received, it is possible to postpone the determination regarding the nip width magnitude, which requires time, and to prevent a delay in the start of the print job. Alternatively, for example, when an instruction related to execution of a specific program for maintenance and inspection is received via the operation acceptor 105, the controller 110 may determine the nip width magnitude in response to the instruction. According to this mode, since the controller performs a determination regarding the nip width magnitude in response to the reception of the specific instruction for maintenance and inspection, it is possible to perform the determination regarding the nip width magnitude, which requires time, for execution only when a service engineer or the like decides that the determination is necessary.

In the example illustrated in FIG. 6, the heater 36 is turned on and off in such a manner that a long ON period indicated by T01 is followed by an OFF period indicated by T02, and the repetition of the ON periods indicated by T03 and the OFF periods indicated by T04 is continued a predetermined number of times. The use of the ON/OFF pattern of the heater 36 determined as described above maintains the temperature of the fusing belt 31 at a temperature close to the target control temperature during the repetition period of T03 and T04 when the nip portion of the fusing unit 17 has the reference size. Due to the heat transferred from the fusing belt 31 via the nip portion, the temperature of the pressing roller 32 gradually approaches the temperature of the fusing belt 31.

Figure 7:
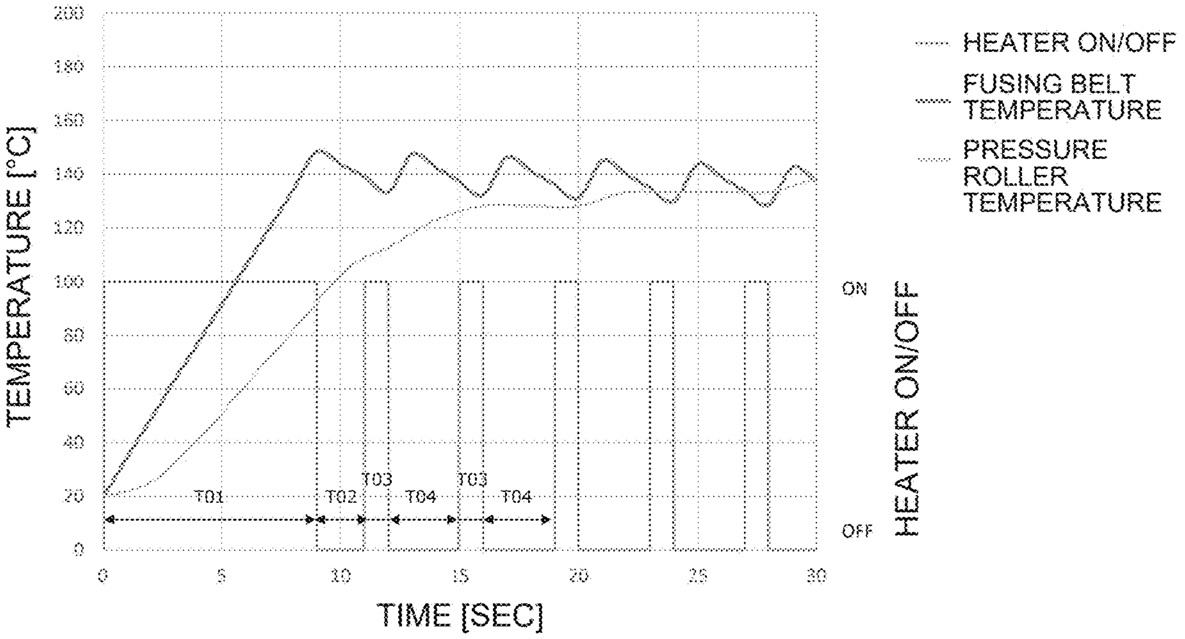
FIG. 7 illustrates temperature variation corresponding to FIG. 6 for a fusing unit having a nip portion larger than a reference in the embodiment of the present disclosure.

FIG. 7 illustrates an example of temperature variation of the fusing belt 31 and the pressing roller 32 when the fusing unit 17 has a nip portion larger than a reference value and the heater 36 is turned on and off in the same pattern as in FIG. 6. In the fusing unit 17 having a nip portion larger than the reference value, the amount of heat transferred from the fusing belt 31 to the pressing roller 32 per unit time is larger than the reference value, and thus the amount of heat removed from the fusing belt 31 is larger. As a result, at the end of the ON period of T01, the temperature of the fusing belt 31 is lower than that in FIG. 6, and the temperature of the pressing roller 32 is higher than that in FIG. 6. The subsequent temperature variation of the fusing belt 31 is also lower than that in FIG. 6, and slightly decreases with the passage of time. In contrast, the temperature variation of the pressing roller 32 is higher than that in FIG. 6.

Figure 8:
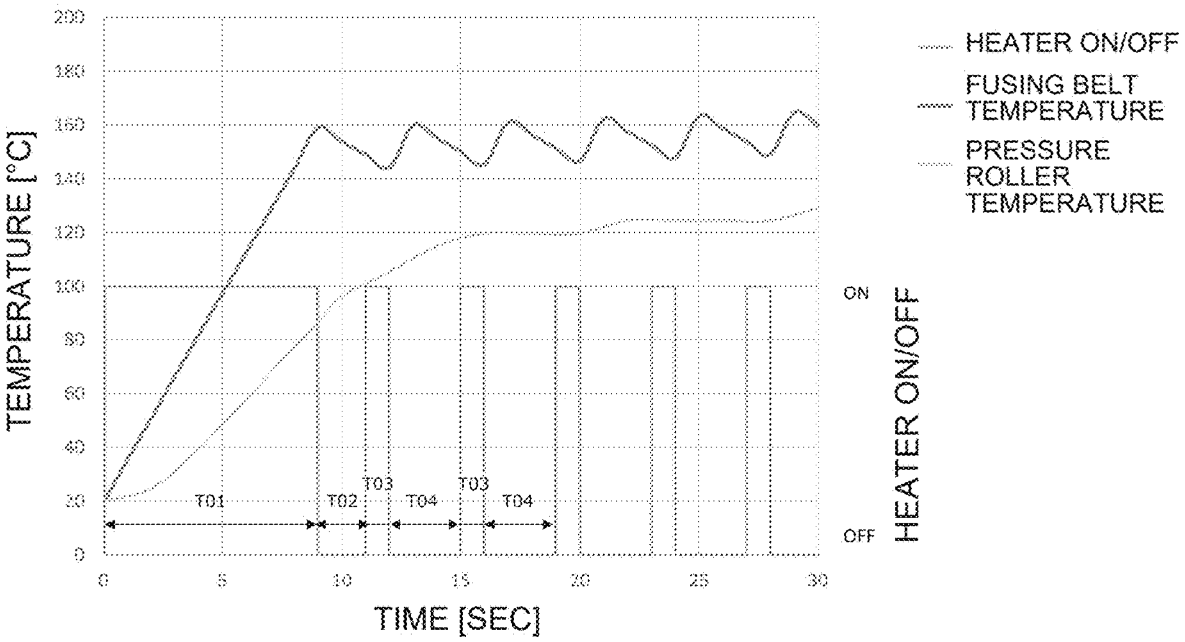
FIG. 8 illustrates temperature variation corresponding to FIG. 6 for a fusing unit having a nip portion smaller than a reference in the embodiment of the present disclosure.

FIG. 8 illustrates an example of temperature variation of the fusing belt 31 and the pressing roller 32 when the fusing unit 17 has a nip portion smaller than a reference value and the heater 36 is turned on and off in the same pattern as in FIG. 6. In the fusing unit 17 having a nip portion smaller than the reference value, the amount of heat transferred from the fusing belt 31 to the pressing roller 32 per unit time is smaller than the reference value, and thus the amount of heat removed from the fusing belt 31 is small. As a result, at the end of the ON period of T01, the temperature of the fusing belt 31 is higher than that in FIG. 6, and the temperature of the pressing roller 32 is lower than that in FIG. 6. The subsequent temperature variation of the fusing belt 31 is also higher than that in FIG. 6, and slightly increases with the passage of time. In contrast, the temperature variation of the pressing roller 32 is lower than that in FIG. 6.

The fusing controller 131 compares the temperature variation of the pressing roller 32 while the heater 36 is turned on and off in a predetermined pattern with reference data stored in advance and determines the amount of heat transferred from the fusing belt 31 to the pressing roller 32 via the nip portion. For example, the amount of heat that moves can be determined by using the temperature variation of the pressing roller 32 from the time when the repetition of T03 and T04 is started to the time when the repetition is ended. Specifically, the determination can be made by using a temperature difference indicating how much the temperature has increased between the time when the repetition of T03 and T04 is started and the time when the repetition is ended. Alternatively, the determination can be made using the average temperature between the start of the repetition of T03 and T04 and the end of the repetition. In any case, the amount of heat that moves can be determined by using the temperature variation of the pressing roller 32 during a period in which the heater 36 is turned on and off constantly by repeating T03 and T04. The size of the nip portion with respect to the reference size is determined from the amount of heat transferred thus obtained.

In this embodiment, the amount of heat that moves is not determined on the basis of how much the temperature of the pressing roller 32 rises during the ON period of T01. The ON period of T01 corresponds to a period from the start to the end of warm-up; since the warm-up period until the print job can be started is a period during which the user is kept waiting, the warm-up period is designed to be shortened as much as possible. The determination of the nip width magnitude is related to the setting of an appropriate target temperature, and requires accurate determination. According to this mode, it is possible to make the temperature variation to be gradual by suppressing the amount of heat generated per unit time when the temperature of the heating portion is raised to the target temperature before printing is performed. By doing so, it is possible to transfer heat from the heating portion to the pressing portion over a longer period of time. Consequently, the nip width magnitude can be determined more accurately. According to this mode, it is possible to determine the nip width magnitude when a determination related to the nip width magnitude is made, by detecting the amount of heat moving from the heating portion via the nip portion while a print sheet is rotated without being conveyed, as the temperature variation of the pressing portion.

Then, the target control temperature of the fusing belt 31 is changed in accordance with the determined size of the nip portion width magnitude respect to the reference size. In the fusing unit 17 having the nip portion larger than the reference, as described above, the amount of heat moving from the fusing belt 31 to the pressing roller 32 per unit time is larger than the reference, so that the drop from the target control temperature of the fusing belt 31 quickly becomes large. The fusing controller 131 correspondingly sets the target control temperature to a higher temperature or increases the amount of power supplied to the heater 36. However, when it is determined that the size of the nip portion is larger than the allowable range, the controller 110 may cause the operation acceptor 105 to display a message prompting replacement of the pressing roller 32. On the contrary, in the fusing unit 17 having the nip portion smaller than the reference, the amount of heat per unit time moving from the fusing belt 31 to the pressing roller 32 is smaller than the reference, so that the drop from the target control temperature of the fusing belt 31 becomes small. The fusing controller 131 correspondingly sets the target control temperature to a lower temperature or reduces the amount of power supplied to the heater 36 by an amount corresponding. However, when it is determined that the size of the nip portion is smaller than the allowable range, the controller 110 may cause the operation acceptor 105 to display a message prompting the inspection of the fusing unit 17.

Flowchart

Figure 9:
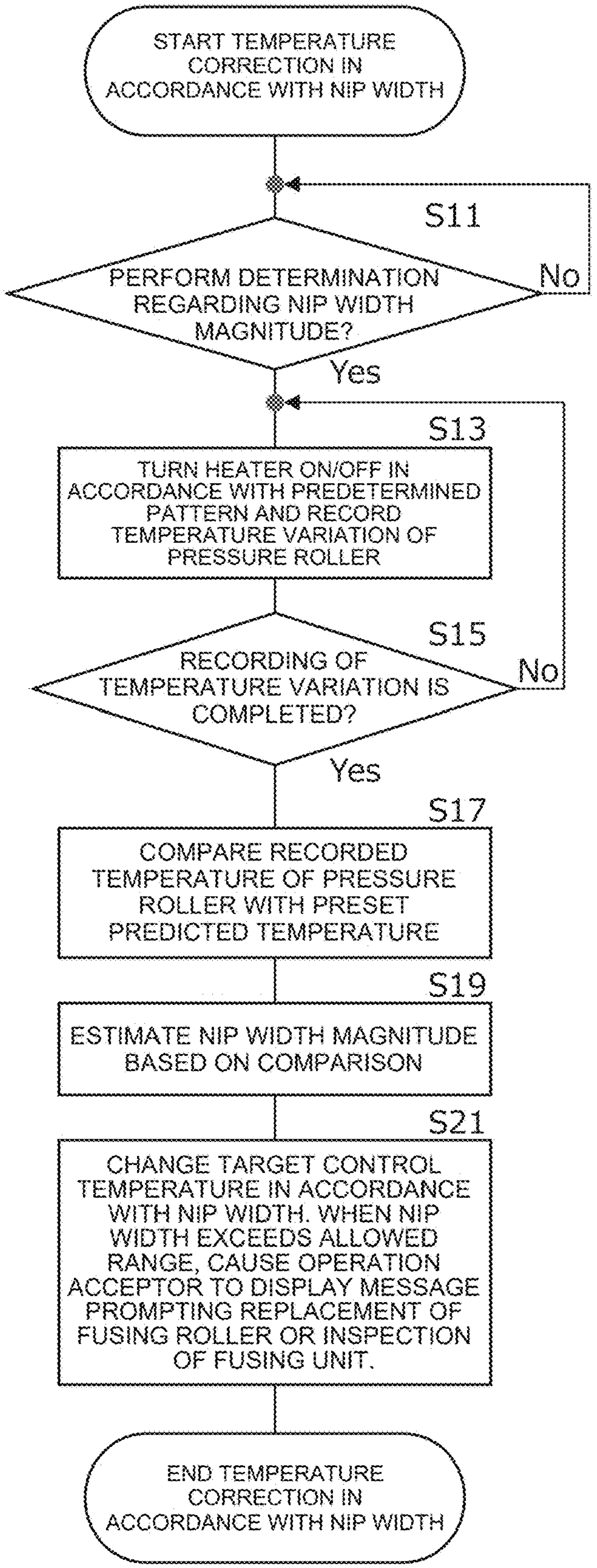
FIG. 9 is a flowchart illustrating an example of a process in which the controller 110 turns on and off the heater in a predetermined pattern, estimates the nip width in Embodiment 1 of the disclosure.

A process in which the controller turns on and off the heater 36 in a predetermined pattern and determines the nip width magnitude will now be explained with reference to a flowchart. FIG. 9 is a flowchart illustrating an example of a process in which the controller 110 serving as the fusing controller 131 turns on and off the heater 36 in a predetermined pattern, estimates the nip width, and changes the control target temperature in this embodiment. FIG. 10A is a table of a calculation example of the estimation of the nip widths and the correction of the target control temperature based on the temperature variation of the pressing roller 32, and FIG. 10B is a table of a numerical example.

As illustrated in FIG. 9, when the controller 110 determines whether the nip width magnitude is large or small (Yes in Step S11), the controller 110 turns on and off the heater 36 in a predetermined pattern as illustrated in FIG. 6, for example, while rotating the pressing roller 32. The fusing controller 131 records the temperature variation of the pressing roller 32 detected by the second fusing-temperature sensor 38B during the period. That is, it is stored in the RAM 122 (a loop of returning to Step S13 via No in Steps S13 and S15). When the predetermined pattern of turning on and off the heater 36 is completed (Yes in Step S15), the fusing controller 131 compares the temperature variation of the pressing roller 32 stored in the RAM 122 with the reference data (Step S17). Then, the nip width magnitude is determined on the basis of the comparison result. In this embodiment, it is assumed that the fusing controller 131 estimates the nip width magnitude as a mode of the determination related to the nip widths (Step S19).

FIG. 10A illustrates an example of a data table used by the fusing controller 131 to estimate the nip width. In the example in FIG. 10A, the reference size (design value) of the nip width is 10 mm. The fusing controller 131 of the controller 110 starts the recording of the temperature variation of the pressing roller 32 at a time point (T=11 sec) when the repetition of T03 and T04 illustrated in FIG. 6 is started. The recording of the temperature variation is ended at the time when T03 and T04 are repeated five times (T=31 sec) (not illustrated in FIG. 6). It is assumed that the predetermined pattern of turning on and off the heater 36 is determined with reference to the turning on and off of the heater 36 in a case where the warm-up of the fusing unit 17 having the reference characteristics of the nip width and the like is performed and the temperature of the fusing belt 31 is maintained at the target control temperature without passing the print sheet. Therefore, in the case of the fusing unit 17 having the reference nip width, it is predicted that the temperature of the fusing belt 31 varies at substantially the same target control temperature as in FIG. 6 when T03 and T04 are repeated in a predetermined pattern. The temperature of the pressing roller 32 is also predicted to vary substantially in the same manner as in FIG. 6. In FIG. 10A, the same temperature value as that of the waveform of FIG. 6 is set as the "reference value." FIG. 10B illustrates a numerical example of a specific predicted temperature. When the nip width is the reference value, the temperature of the pressing roller 32 (referred to as the reference value of the pressing roller temperature) is 105° C. at the start of recording and 137° C. at the end of recording. The temperature of the fusing belt 31 (which is the reference value of the fusing belt temperature) is 145° C. at the start of recording and 145° C. at the end of recording. Note that the numerical example is a mean value of one cycle in which the heater 36 is turned on and off (see the middle row in FIG. 10B).

When the nip width of the fusing unit 17 is larger than the reference value by 1 mm, the amount of heat that is taken away from the fusing belt 31 increases as illustrated in FIG. 7. As a result, it is predicted that the temperature of the pressing roller 32 is higher than the reference value of the pressing roller temperature by 4° C. at the start of recording and higher than the reference value of the pressing roller temperature by 34° C. at the end of recording. In contrast, the temperature of the fusing belt 31 is predicted to be lower than the reference value of the fusing belt temperature by 6° C. at the start of recording and lower than the reference value by 11° C. at the end of recording (see the lowermost line in FIG. 10A). In the specific numerical example illustrated in FIG. 10B, the temperature of the pressing roller 32 is predicted to be 109° C. at the start of recording and 139° C. at the end of recording. The temperature of the fusing belt 31 is predicted to be 139° C. at the start of recording and 134° C. at the end of recording (see the lowermost line in FIG. 10B). In contrast, when the nip width is smaller than the reference value by 1 mm, the amount of heat that is taken away from the fusing belt 31 is smaller as illustrated in FIG. 8. As a result, it is predicted that the temperature of the pressing roller 32 is lower than the reference value by 4° C. at the start of recording and is higher than the reference value by 25° C. at the end of recording. In contrast, the temperature of the fusing belt 31 is predicted to be higher than the reference value by 4° C. at the start of recording and higher than the reference value by 15° C. at the end of recording (see the uppermost row in FIG. 10A). In the specific numerical example illustrated in FIG. 10B, the temperature of the pressing roller 32 is predicted to be 101° C. at the start of printing and 130° C. at the end of printing (see the top row in FIG. 10B).

The fusing controller 131 compares the recorded temperature variation of the pressing roller 32 with the predicted temperature illustrated in FIG. 10B. In the comparison with the predicted temperature, for example, a mean value of a difference (first difference) between the recording temperature at the recording start time and the predicted temperature and a difference (second difference) between the recording temperature at the recording end time and the predicted temperature may be set as a deviation from the reference value. Alternatively, in more detail, the predicted temperatures at the end points of the respective repetitions of T03 and T04 may be prepared, and the deviation from the reference value may be calculated using the mean value of the differences between the recorded temperatures at the repetition end points and the predicted temperatures. FIG. 10B illustrates numerical examples of the predicted temperatures of the nip width at the recording start time and the recording end time for three cases of the reference value and the reference value±1 mm. If the recorded temperature variation of the pressing roller 32 is within this range, the fusing controller 131 preferably estimates the nip width more finely than a 1-mm unit by using an interpolation method. The interpolation may be linear interpolation or higher-dimensional interpolation. The fusing controller 131 corrects the target control temperature in accordance with the estimated nip width (Step S21 in FIG. 9). For example, when the estimated nip width is larger than the reference value by 1 mm, the target control temperature is set to the reference value×0.95 (refer to the lowermost row of the column at the right end in FIG. 10A). In the numerical example in FIG. 10B, the target control temperature is changed to 143° C. (refer to the lowermost row of the right end column in FIG. 10B). In contrast, when the estimated nip width is smaller than the reference value by 1 mm, the target control temperature is set to the reference value×1.05 (refer to the uppermost stage of the column at the right end in FIG. 10A). In the numerical example in FIG. 10B, the target control temperature is changed to 158° C. (refer to the uppermost row of the rightmost column in FIG. 10B).

Similar to the estimation of the nip width, it is preferable to apply an interpolation method to the correction of the target control temperature. When the temperature variation exceeds the range in FIG. 10A or 10B, the fusing controller 131 determines that the nip width exceeds the allowable range. In this case, the controller 110 causes the operation acceptor 105 to display a message prompting replacement of the pressing roller 32 or inspection of the fusing unit. Noted that the range of the nip width in FIGS. 10A and 10B, that is, the reference value±1 mm are mere examples. The allowable range may be wider, for example, the reference value±3 mm. In this case, predicted temperatures of the reference value±2 mm and the reference value±3 mm may be prepared.

Embodiment 2

In the first embodiment, the fusing controller 131 compares the temperature variation of the pressing roller 32 with the reference data, and determines the size of the nip portion with respect to the reference size. Meanwhile, in this embodiment, the temperature variation of the fusing belt 31 is used in addition to the temperature variation of the pressing roller 32 to compare the ratio between these two with reference data and determine the size of the nip portion with respect to the reference size. The amount of heat generated per unit time when the heater 36 is turned on may change due to a voltage fluctuation in an AC power supply. Even when the amount of heat supplied from the heater 36 to the fusing belt 31 per unit time varies due to a fluctuation in the voltage of the AC power supply, the ratio of the amount of heat transferred to the pressing roller 32 to the total amount of heat supplied is substantially the same as long as the size of the nip portion is the same. Therefore, it is possible to more accurately determine the size of the nip portion with respect to the reference size by using the temperature variation of the fusing belt 31 related to the amount of heat per unit time supplied to the fusing belt 31 via the fusing belt 31 and the temperature variation of the pressing roller 32 related to the amount of heat transferred to the pressing roller 32. According to this mode, it is possible to determine the nip width magnitude when a determination related to the nip width is made, by detecting the amount of heat moving from the heating portion via the nip portion while a print sheet is rotated without being conveyed from both the temperature variation of the heating portion and the temperature variation of the pressing portion. By doing so, it is possible to estimate the total amount of heat supplied to both the heating portion and the pressing portion and the amount of heat supplied to the pressing portion through the nip portion, and thus the nip width magnitude can be determined more accurately.

Figure 11:
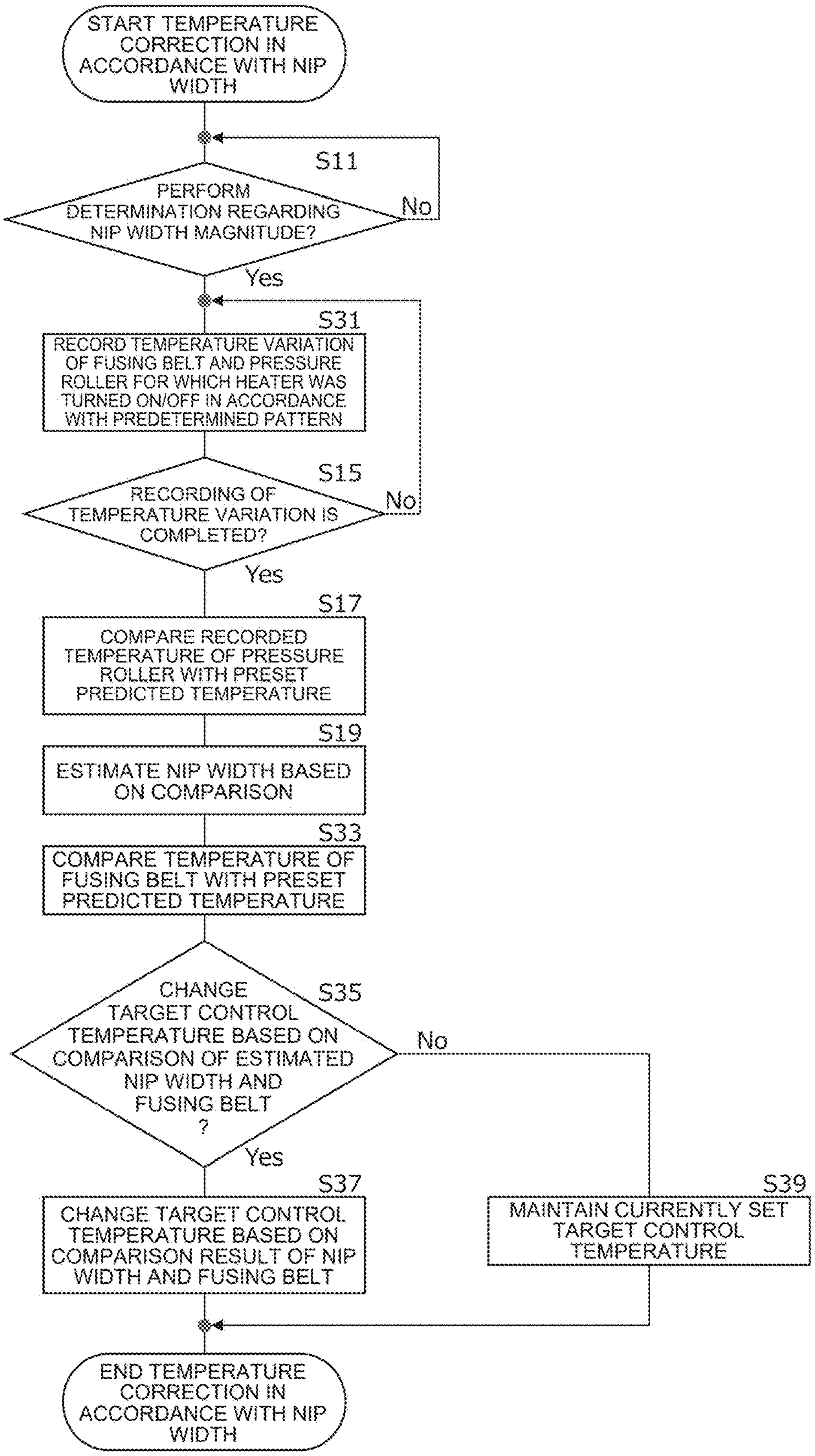
FIG. 11 is a flowchart illustrating an example of a process in which the controller 110 turns on and off the heater in a predetermined pattern, estimates the nip width in Embodiment 2 of the disclosure.

FIG. 11 is a flowchart illustrating an example of a process in which the controller 110 turns on and off the heater in a predetermined pattern, estimates the nip width, and changes the control target temperature in Embodiment 2. That is, it corresponds to the flowchart of FIG. 9 according to Embodiment 1. In FIG. 11, the processing steps that are the same as those of FIG. 9 are denoted by the same reference numerals. The process up to the estimation of the nip width in Step S19 is substantially the same as that in FIG. 9. The difference from FIG. 9 is that the fusing controller 131 records the temperature variation of the fusing belt in addition to the temperature variation of the pressing roller 32 (Step S31 in FIG. 11). Similarly to FIG. 9, the fusing controller 131 estimates the nip width on the basis of the temperature variation of the pressing roller 32 (Step S19 in FIG. 11).

Next, the fusing controller 131 sets the mean value of the difference between the recorded temperature and the predicted temperature as the deviation from the reference value (Step S33). That is, in addition to a first difference and a second difference, the mean value of the difference (third difference) between the recording temperature and the predicted temperature at the recording start time of the fusing belt 31 and the difference (fourth difference) between the recording temperature and the predicted temperature at the recording end time of the fusing belt 31 is used to obtain the deviation from the reference value. As described above, the first difference is the difference between the recording temperature of the pressing roller 32 at the recording start time and the predicted temperature. The second difference is the difference between the recording temperature and the predicted temperature at the recording end time. The fusing controller 131 corrects the target control temperature in accordance with the obtained deviation from the reference value. That is, in addition to the temperature variation of the pressing roller 32, the temperature variation of the fusing belt 31 is added to the calculation of the deviation from the reference value, and, on the basis of the calculation result, it is determined whether or not the correction of the target control temperature is necessary (Step S35).

If it is determined that the target control temperature needs to be corrected (Yes in Step S35), the target control temperature is changed on the basis of FIG. 10A or 10B (Step S37). Meanwhile, if it is determined that the correction of the target control temperature is not necessary (No in Step S35), the current target control temperature is maintained (Step S39). Then, the process ends. As described with reference to FIG. 9, a warning message may be displayed when the deviation of the temperature variation from the reference value exceeds an allowable range.

Embodiment 3

In Embodiments 1 and 2, on the premise that the fusing unit 17 includes the second fusing-temperature sensor 38B that detects the temperature of the pressing roller 32, the nip width magnitude is determined using at least the temperature variation of the pressing roller 32. The fusing unit 17, which does not include the second fusing-temperature sensor 38B for detecting the temperature of the pressing roller 32, includes the first fusing-temperature sensor 38A for detecting the temperature of the fusing belt 31. It is also possible to determine the size of the nip portion with respect to the reference size using only the temperature variation of the fusing belt 31. If the voltage fluctuation of the AC power supply is negligible, the size of the nip portion with respect to the reference size can be determined on the basis of the magnitude of the temperature variation of the fusing belt 31 with respect to the reference data.

It should be understood that the disclosure includes combinations of any of the above-described modes.

Various modifications can be made to the disclosure in addition to the above-described embodiments. These modifications should not be construed as falling outside the scope of the disclosure. The invention according to the disclosure should include all modifications that are equivalent to the scope of the claims and fall within the scope of the disclosure.

What is claimed is:

1. An image forming apparatus comprising:

a heating portion that is rotatable, including a heating source;

a pressing portion that is rotatable and that presses the heating portion while being in contact with the heating portion;

a temperature detector that detects a temperature of the heating portion by using a heating-side temperature detector, and a temperature of the pressing portion by using a pressing-side temperature detector;

a conveyer that rotates and stops the heating portion and the pressing portion, and guides a print sheet, on which a toner is transferred, through a nip portion where the heating portion and the pressing portion are in contact with each other; and a controller that controls the heating source and the conveyer, wherein the controller;

controls the heating source such that the temperature of the heating portion becomes a target temperature during execution of a print job, and controls the conveyer to rotate the heating portion and the pressing portion when the print job is not being executed, obtains a temperature variation of the pressing portion from the pressing-side temperature detector, determines a nip width magnitude based on a relationship between an amount of heat generated by the heating source and the temperature variation of the pressing portion, and changes the target temperature based on the determination.

2. The image forming apparatus according to claim 1, wherein the controller suppresses a first amount of heat generated by the heating source per unit time when the controller determines the nip width magnitude, to a second amount of heat lower than the amount of heat generated by the heating source per unit time when the temperature of the heating portion is raised to the target temperature to execute the print job or make the print job executable.

3. The image forming apparatus according to claim 2, wherein the controller:

determines the nip width magnitude based the relationship between the generated heat and the temperature variation of the pressing portion after rotating the heating portion and the pressing portion, the heating portion and pressing portion being rotated every time a warm-up is performed after starting processing from a power-off or power-saving state, in which processing is stopped, or when a predetermined condition is satisfied after the warm-up is performed, and when a print job is to be executed, the controller prioritizes execution of the print job and does not determine the nip width magnitude.

4. The image forming apparatus according to claim 1, wherein the controller:

rotates the heating portion and the pressing portion every time a warm-up is performed after starting processing from a power-off state or a power saving state, in which the processing is stopped, or when a predetermined condition is satisfied after the warm-up is performed.

5. The image forming apparatus according to claim 1, wherein, when an instruction, that is prepared in advance for maintenance and inspection, is received, the controller executes processing of determining the nip width magnitude in response to the instruction.

6. A fusing control method performed by a controller to control an image forming apparatus, the image forming apparatus including:

a heating portion that is rotatable, including a heating source;

a pressing portion that is rotatable and that presses the heating portion while being in contact with the heating portion;

a temperature detector that detects a temperature of the heating portion by using a heating-side temperature detector, and a temperature of the pressing portion by using a pressing-side temperature detector; and a conveyer that rotates and stops the heating portion and the pressing portion, and guides a print sheet, on which a toner is transferred, through a nip portion where the heating portion and the pressing portion are in contact with each other, the fusing control method comprising:

controlling the heating source such that the temperature of the heating portion becomes a target temperature during execution of a print job, and controlling the conveyer to rotate the heating portion and the pressing portion when the print job is not being executed;

obtaining a temperature variation of the pressing portion from the pressing-side temperature detector;

determining the nip width magnitude based on a relationship between an amount of heat generated by the heating source and the temperature variation of the pressing portion; and changing the target temperature based on the determination.

* * * * *